United States Patent
Wang et al.

(10) Patent No.: US 8,976,653 B2
(45) Date of Patent: Mar. 10, 2015

(54) COMMUNICATION DEVICES AND METHODS FOR DETERMINING STATUS OF REMOTE COMMUNICATION DEVICES

(75) Inventors: Hsu-Hui Wang, Taoyuan County (TW); Kuang-Yu Yen, Hsinchu County (TW); Jia-Ching Shen, Taipei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 845 days.

(21) Appl. No.: 13/021,592

(22) Filed: Feb. 4, 2011

(65) Prior Publication Data

US 2011/0194440 A1    Aug. 11, 2011

(30) Foreign Application Priority Data

Feb. 5, 2010    (TW) ................................ 99103584 A

(51) Int. Cl.
*H04L 12/26*  (2006.01)
*H04L 12/801* (2013.01)
*H04L 12/825* (2013.01)

(52) U.S. Cl.
CPC ........... *H04L 43/045* (2013.01); *H04L 43/0876* (2013.01); *H04L 47/12* (2013.01); *H04L 47/25* (2013.01)
USPC ............................. 370/231; 370/236; 709/232

(58) Field of Classification Search
None
See application file for complete search history.

(56) References Cited

U.S. PATENT DOCUMENTS

| | | | |
|---|---|---|---|
| 7,035,291 B2* | 4/2006 | Grinfeld | 370/503 |
| 7,054,790 B1* | 5/2006 | Rich | 702/186 |
| 8,023,487 B2* | 9/2011 | Popescu et al. | 370/342 |
| 8,259,728 B2* | 9/2012 | Mizrachi et al. | 370/394 |
| 8,406,133 B2* | 3/2013 | Yeung et al. | 370/231 |
| 2008/0176509 A1 | 7/2008 | Yen et al. | |
| 2008/0212575 A1 | 9/2008 | Westberg | |
| 2008/0285455 A1* | 11/2008 | Droz et al. | 370/235 |

FOREIGN PATENT DOCUMENTS

| | | |
|---|---|---|
| CN | 101009535 | 8/2007 |
| TW | 370757 | 9/1999 |
| TW | 201001993 | 1/2010 |

* cited by examiner

*Primary Examiner* — Alex Skripnikov
(74) *Attorney, Agent, or Firm* — McClure, Qualey & Rodack, LLP

(57) ABSTRACT

A communication device may include a transmitting circuit for transmitting packets from a first communication device to a second communication device and a processor in the first communication device and coupled with the transmitting circuit. The processor may evaluate the packet receipt status information to identify a packet receipt characteristic associated with the second communication device and control data packet transmission from the first communication device to the second communication device based on the packet receipt characteristic associated with the second communication device.

20 Claims, 12 Drawing Sheets

COMMUNICATION DEVICES AND METHODS FOR DETERMINING STATUS OF REMOTE COMMUNICATION DEVICES

This application claims the benefit of Taiwan Application No. 99103584, filed Feb. 5, 2010, the subject matter of which is incorporated herein by reference.

TECHNICAL FIELD

The disclosed embodiments relate to communication systems and methods and more particularly relates to systems and methods that may affect transmission control based on the detected status of one or more remote devices.

BACKGROUND

Wireless communication system may have different types of network structures or architectures, such as an independent network structure and a central-control network structure. As an illustrative, non-limiting example, a central-control network may include at least one host interface, e.g., a base station and a wireless access point ("AP"), and several transmission interfaces, e.g., work stations or user devices. Before acquiring network services, a transmission interface has to be connected to the host interface. In contrast, an independent network may include several transmission interfaces that may operate independent from each other, including having peer-to-peer communications between two transmission interfaces that may operate within a limited range.

As an illustrative, non-limiting example, a central-control network may include work stations or user devices with different transmission efficiencies or characteristics, such as work stations having high-speed transmission capabilities joined by work stations having only low-speed transmission capabilities. A main system, such as a base station or its interface, may use different transmission modes, such as modes with different transmission rates (i.e., from 24 MBit/sec to 48 Mbit/sec, 54 Mbit/sect, etc.), to perform data transmission with work stations having different transmission (and data-receiving) speeds or capabilities. As an example, under the IEEE 802.11 standard, when a main system interface performs communication with a work station with only low-speed transmission capability, the work station may use a lower transmission rate, which requires more communication time. This affects the communication between a main system interface and a work station with high-speed transmission capabilities.

Therefore, it is desirable to have communication devices and methods that, in some examples or applications, may reduce or avoid one or more of the drawbacks existing in traditional systems.

SUMMARY

Consistent with the disclosed embodiments, a communication method may include: transmitting data packets from a first communication device to a second communication device; and examining packet receipt status information from the second communication device. The packet receipt status information may include or indicate packet receipt status of the data packets by the second communication device. The method may further include evaluating the packet receipt status information at the first communication device to identify a packet receipt characteristic associated with the second communication device; and controlling data packet transmission from the first communication device to the second communication device based on the packet receipt characteristic associated with the second communication device.

Consistent with the disclosed embodiments, another communication method may include transmitting data packets from a first communication device to a plurality of second communication devices; and examining packet receipt status information from each of at least some of the plurality of the second communication devices. The packet receipt status information of each corresponding second communication device may include status indication of the data packets received by the corresponding second communication device. The method may further include evaluating the packet receipt status information of the corresponding second communication devices at the first communication device to identify packet receipt characteristics associated with the corresponding second communication devices; and controlling data packet transmission from the first communication device to the at least some of the plurality of the second communication devices based on the packet receipt characteristics.

Consistent with the disclosed embodiments, a communication device may include a transmitting circuit for transmitting packets from a first communication device to a second communication device and a processor in the first communication device and coupled with the transmitting circuit. The processor may evaluate the packet receipt status information to identify a packet receipt characteristic associated with the second communication device and control data packet transmission from the first communication device to the second communication device based on the packet receipt characteristic associated with the second communication device.

DETAILED DESCRIPTION

The following descriptions of exemplary embodiments are presented herein for the purposes of illustration, and they are not intended to be exhaustive or to be limited to the precise form disclosed.

Some of the disclosed embodiments relate to methods or devices that determine the operating status of the remote device (e.g. whether the remote device is congested, how the remote device is congested, etc.) by estimating/analyzing the transmission situation of packets.

Figure 1A:
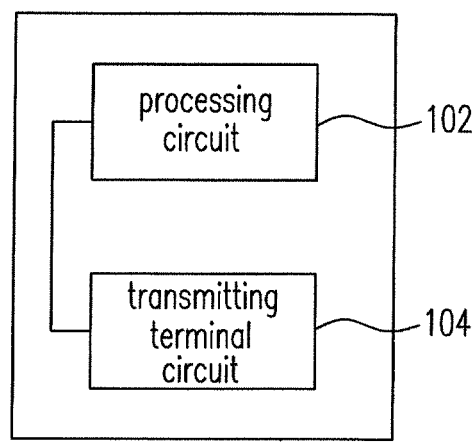
FIG. 1(a) shows a communication device consistent with the disclosed embodiments.

FIG. 1(a) illustrates a communication device consistent with the disclosed embodiments. Referring to FIG. 1(a), the communication device 10 may include a transmitting terminal circuit 104 and a processing circuit 102. The transmitting terminal circuit 104 may transmit a plurality of packets to one or more remote communication device (not shown). The processing circuit 102 is coupled to the transmitting terminal circuit 104, and the processing circuit 102 may analyze the transmission of the packets to determine the status of the remote communication device(s). The processing circuit 102 may also control or adjust the setting of the transmitting terminal circuit 104 based on the status of the remote communication device(s). The following descriptions illustrate examples of how the setting of the transmitting terminal circuit 104 may be controlled or adjusted.

Figure 1B:
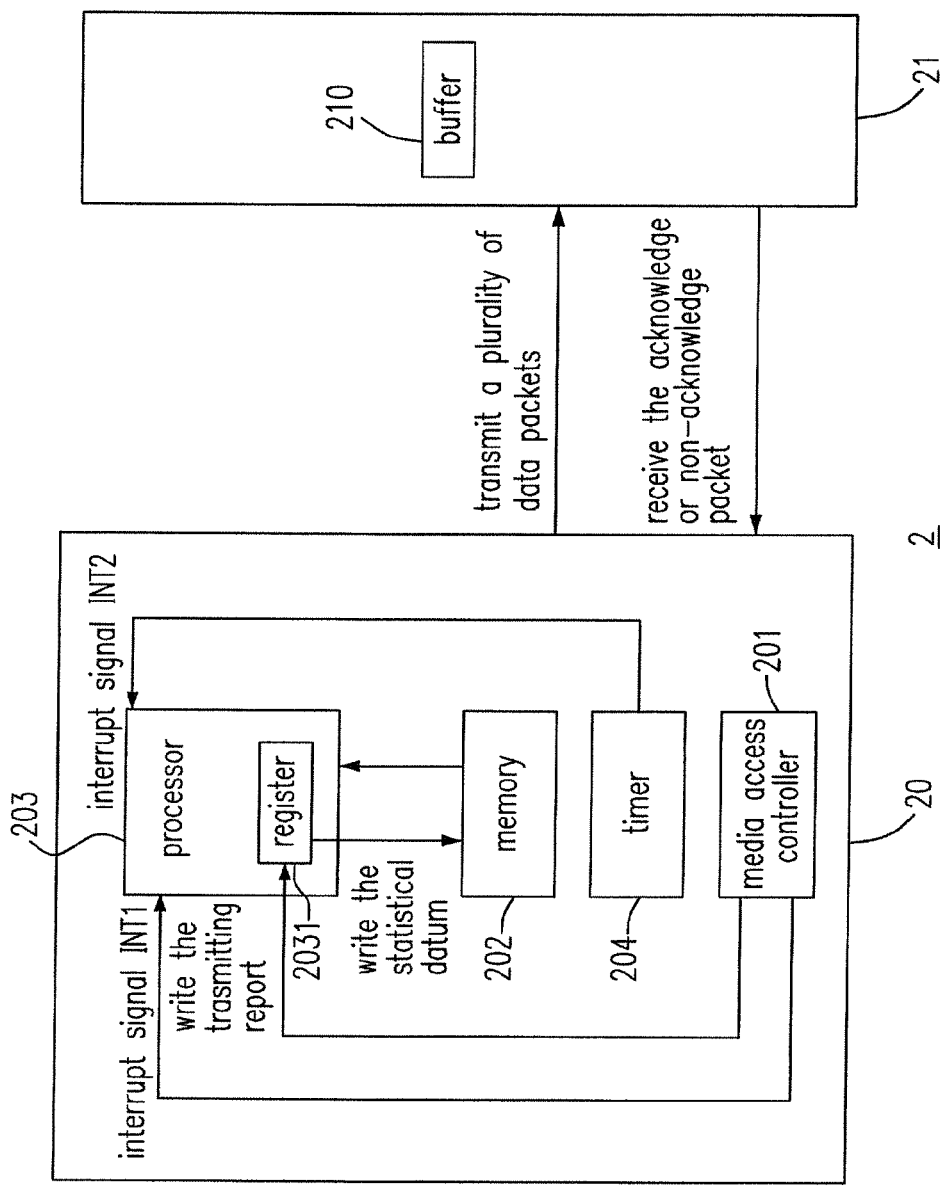
FIG. 1(b) shows an exemplary communication detecting system consistent with the disclosed embodiments.

FIG. 1(b) shows an exemplary communication detecting system consistent with the disclosed embodiments. The communication detecting system 2 includes a first communication device 20, which may be a central communication device and a second communication device 21, which may be a remote communication device. The first communication device 20 may include a processor 203, a memory 202, a timer 204 and a media access controller 201, which may be coupled with each other. The processor 203 may include a register 2031. The second communication device 21 has a receiving interface, which may be a buffer 210.

In FIG. 1(b), the first communication device 20 may include a transmitting interface or terminal. The transmitting interface may include the media access controller 201, which may provide a transmitting report based on at least one result of transmitting packets or receive or examine packet receipt status information associated with the packet receipt status at the second communication device. The processor 203 may receive and analyze the transmitting report or evaluate the packet receipt status information to identify a packet receipt characteristic associated with the second communication device 21 to analyze the status of the channel or remote devices, such as whether the network is congested, whether the second communication device 21 has limited processing rate or capabilities, etc. The processor 203 may control data packet transmission from the first communication device 20 to the second communication device 21 based on the packet receipt characteristic associated with the second communication device 21 or adjust the transmission efficiency of the communication device 20 based on the status of the channel or remote devices, (e.g., how the network is congested). For example, the processor 203 can affect the control or adjustment by adjusting the transmitting period between data packets, packet groups, or other data units or by adjusting the transmitting rates of packets. In some embodiments, whether the network, channel, or remote device is congested may be affected by, for example, the interface capacity (e.g., the capacity of the buffer 210 of the second communication device 21) of a receiving terminal (i.e. the second communication device 21). The buffer 210 can be a register, memory space, any types of memories, or other memory elements.

When the first communication device 20 receives the acknowledgement packet, or non-acknowledgement packet, which the second communication device 21 may transmit, or receives no acknowledgement for certain packets, the media access controller 201 or the processor 203 may examine such packet receipt status information. The packet receipt status information may include or reflect packet receipt status of the data packets by the second communication device 21. The processor 203 (or the media access controller 201, which may be or be considered part of the processor 203) may evaluate the packet receipt status information at the first communication device to identify a packet receipt characteristic associated with the second communication device. In one embodiment, the processor 203 may generate a transmitting report and store it in the register 2031, and the transmitting report may include the transmission time(s) of the data packets and the number of data packets received by the second communication device 21.

In one embodiment, the media access controller 201 may send an interrupt signal INT1 to the processor 203. After receiving interrupt signal INT1, the processor 203 may examine or evaluate the transmitting report, such as by summing up the data packets received by the second communication device 21 at the same transmission time, to obtain a statistical datum. Then, the processor 203 may store the statistical datum to the memory 202 and clear the register 2031. In one example, the timer 204 may send an interrupt signal INT2 to the processor 203 at a constant time interval or when some specific condition is met. After the statistical datum is stored, the processor 201 may read the statistical datum from the memory 202 so the first communication device 20 can determine packet receipt characteristic associated with the second communication device 21, such as the status or capability of its buffer 210 or the congestion status of the second communication device 21.

In some embodiments, the transmitting report may include a first datum (i.e., the transmission times of the data packets and the quantity of data packets received by the second communication device 21). The register 2031 stores the first datum, which may reflect the quantity of data packets successfully transmitted. The memory 202 stores a second datum (i.e. the statistical datum). The timer 204 generates the interrupt signal INT2. The processor 203 sums up the first datum at the same transmission time to obtain the second datum and stores it in the memory 202. The processor 203 reads the second datum after receiving the interrupt signal INT2, and analyzes the traffic status of the network thereby. In another embodiment, the timer 204 can be replaced by a counter. For example, when a certain quantity of data packets have been transmitted, the counter may send the interrupt signal INT2 to the processor 203.

As an illustrative example, communication methods that may work with the communication detecting system 2 or other systems are described below. In one embodiment, a communication method may include the following steps:

S11: the first communication device 20 transmitting data packets to the second communication device 21;

S12: the first communication device 20 examining packet receipt status information from the second communication device, such as by receiving, examining, or estimating the retry situation of the data packets to obtain the statistical datum; and S13: evaluating the packet receipt status information at the first communication device to identify a packet receipt characteristic associated with the second communication device, such as by analyzing the statistical datum to determine the congestion status of the second communication device 21.

These steps can be varied or implemented differently. The following provide an example of estimating the transmission situation of packets to determine the operating status of the remote device (e.g. whether the remote device is congested, how congested the remote device is, whether the buffer of the remote device is full or near full, etc.).

Figure 2A:
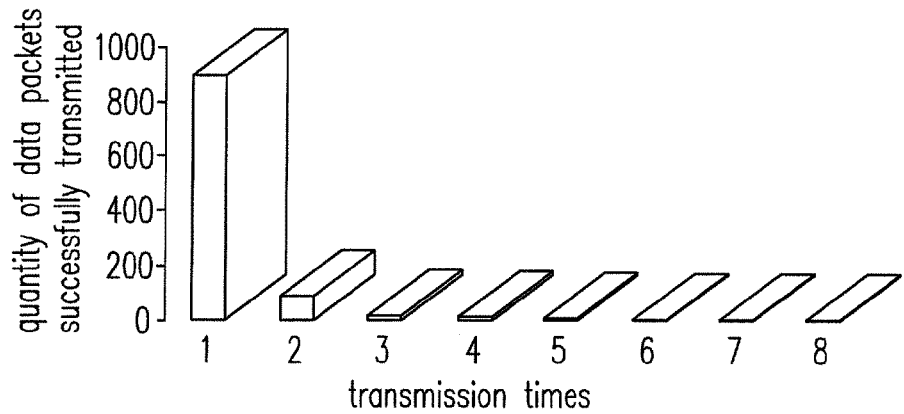
FIG. 2(a) shows an exemplary histogram relating to the retry of sending data packets caused by a low signal-to-noise ratio ("SNR"), consistent with the disclosed embodiments.

FIG. 2(a) shows an exemplary histogram relating to the retry of sending data packets caused by a low signal-to-noise ratio ("SNR"), consistent with the disclosed embodiments. Referring to FIG. 2(a), the transverse axle represents the transmission time of data packets, and the vertical axle represents the quantity of data packets successfully transmitted. In FIG. 2(a), the wireless channel is affected only or primarily by a low SNR. Assuming that there are 1000 data packets to be transmitted, and 1000 data packets are transmitted at the first transmission. However, because the wireless channel is affected by a low SNR, 900 data packets are successfully transmitted, and the remaining 100 data packets need to be retried. Therefore, the remaining 100 data packets (or most of them, in some cases) are successfully transmitted at the first retry (i.e. the second transmission). Nevertheless, about 90 data packets are successfully transmitted at the first retry, and the remaining 10 data packets need to be retried due to a low SNR. The remaining data packets are retried continuously according to the above-mentioned method until all of them are successfully transmitted. It is found that in the wireless channel affected only by a low SNR, the distribution of the transmission time of data packets versus the quantity of data packets successfully transmitted presents an exponential or nearly exponential decay. The processor 203 may receive and analyze transmitting report or information similar to what is described above to determine that the transmission process is affected only or mainly by a low SNR and the receiving function of the receiving terminal is normal (i.e. the operating status of the receiving terminal is normal). In other words, under such circumstance, the controlling method of the processor 203 may be adjusted based on the need for retries or based on telecommunication protocols dealing with retries or low SNRs, such as one of the IEEE 802.11 standards.

Figure 2B:
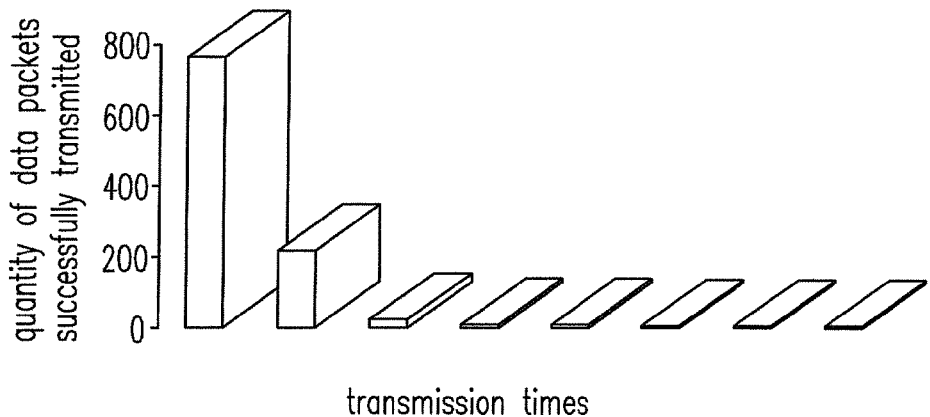
FIG. 2(b) shows an exemplary histogram relating to the retry of sending data packets caused by noise and collision, consistent with the disclosed embodiments.

Referring to FIG. 2(b), an exemplary histogram relating to the retry of sending data packets caused by noise and collision, consistent with the disclosed embodiments. When estimating the transmission times of data packets, if the transmitting terminal discovers that the distribution of the quantity of data packets successfully transmitted does not present exponential decay, it is likely that there are other factors to affect the retry. With FIG. 2(b), the distribution of the quantity of data packets successfully transmitted does not present exponential decay, but still presents the pattern that is decreased gradually with the transmission times. Besides being affected by a low SNR, it is possible that the wireless channel is affected by collisions, which may result from competing uses of the wireless channel. This increases the quantity of data packets at the first retry (i.e., the receiving function of the receiving terminal is normal (i.e., the operating status of the receiving terminal is normal)). Assuming that there are 1000 data packets to be transmitted, and 1000 data packets are transmitted at the first transmission. However, because the wireless channel is affected by a low SNR and collisions, about 800 data packets are successfully transmitted, and the remaining 200 data packets need to be retried. Therefore, the quantity of data packets at the first retry (the second transmission) is about 200, which is about two times larger than the number of retries when they are caused only or mainly by a low SNR.

Figure 2C:
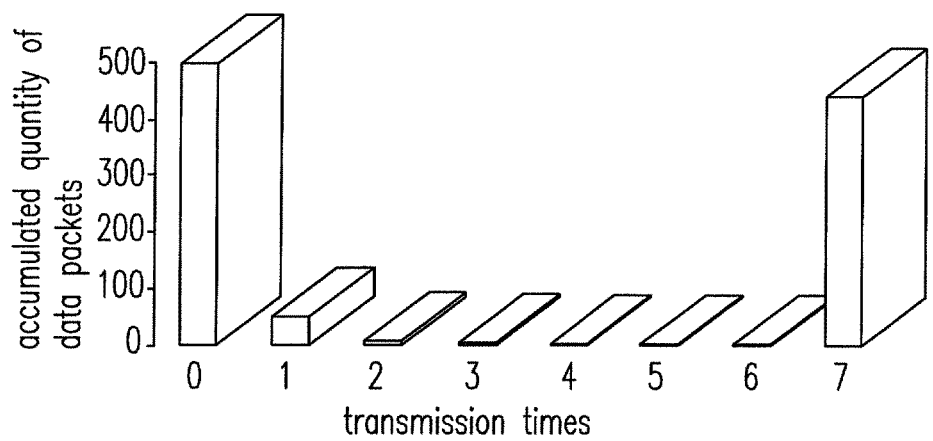
FIG. 2(c) shows an exemplary histogram relating to the retry of sending data packets due to the receiving terminal's buffer full, consistent with the disclosed embodiments.

FIG. 2(c) shows an exemplary histogram relating to the retry of sending data packets due to the receiving terminal's buffer full, consistent with the disclosed embodiments. With FIG. 2(c), the distribution of the quantity of data packets successfully transmitted does not present exponential decay, and the times of abandoning retry is more than the times of successful retry. Hence, it is possible that since the times of abandoning retry is more than the times of successful retry, the signal transmission is not interfered. Instead, the receiving terminal might have receiving or receiving capability problems, such as having limited capacity of the receiving terminal buffer or malfunctions. In FIG. 2(c), the processor 203 may discover that the receiving terminal still can receive some data, so that the possibility that the receiving terminal malfunctions can be excluded. In other words, in this embodiment, when the processor 203 observes statistical data similar to what FIG. 2(c) illustrates, the processor 203 can determine that the capacity of the receiving terminal buffer may be full. Since the data transmission rate of 802.11n is much higher than those of 802.11a, 802.11b and 802.11g, such situation may occur more frequently with 802.11n. Besides, in FIG. 2(c), the times of successfully transmitting data packets at the first retry, the second retry, the third retry, the fourth retry, the fifth retry and the sixth retry are low, wherein the most possible reason is that the receiving terminal buffer is seriously occupied for a period of time (e.g. the receiving terminal cannot receive the newly transmitted packets since the receiving terminal buffer is seriously occupied at the first retry to the sixth retry). That is to say, in this situation, the processor 203 determines that the capacity of the receiving terminal buffer is full so that the receiving terminal cannot receive normally for the moment.

Figure 2D:
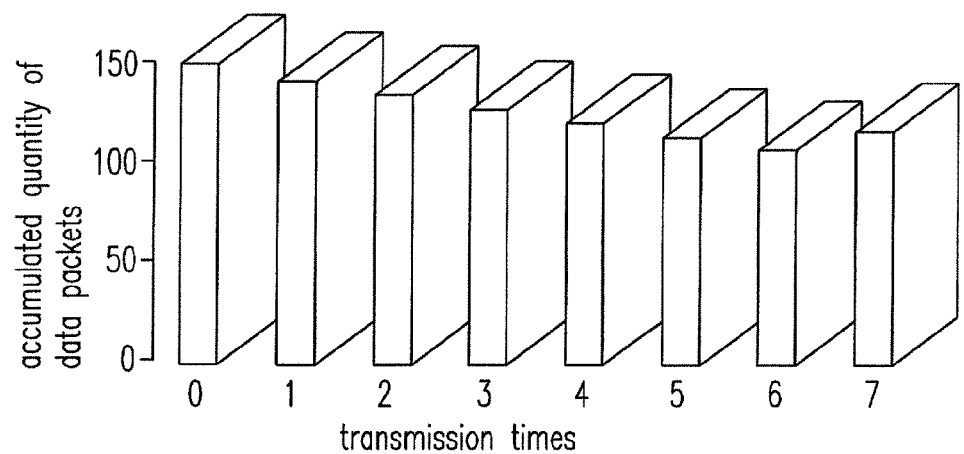
FIG. 2(d) shows an exemplary histogram relating to the retry of sending data packets due to the receiving terminal's buffer overflow, consistent with the disclosed embodiments.

Please refer to FIG. 2(d), which shows an exemplary histogram relating to the retry of sending data packets due to the receiving terminal's buffer overflow, consistent with the disclosed embodiments. With FIG. 2(d), the times at the first retry are about the same as those prior to abandoning retry (i.e., "the sixth retry" in FIG. 2(d)), excluding the possibility that the receiving terminal malfunctions (the receiving terminal still can receive data packets). In this embodiment, when the processor 203 receives the statistical data of FIG. 2(d), it can determine that the receiving terminal buffer is overflowing. In the typical distribution of this situation, the times of abandoning retry are still more than those of successful retry prior thereto. Besides, in FIG. 2(d), when data packets are successfully transmitted at the first retry, the second retry, the third retry, the fourth retry, the fifth retry and the sixth retry, the most possible reason is that the receiving terminal buffer is partially occupied (not released). Accordingly, the receiving terminal still can receive a part of data packets transmitted from the transmitting terminal. That is to say, in this situation, the processor 203 determines that the receiving terminal buffer is overflowing so that the receiving terminal, in part, cannot receive normally.

Furthermore, a first statistical datum can be obtained through the above-mentioned methods. The first statistical datum is depicted as the histogram, wherein the transverse axle represents the transmission time of data packets and the vertical axle represents the accumulated quantity of data packets, as shown in FIG. 2(c) or FIG. 2(d). The transmitting terminal can determine how the receiving terminal (i.e., the remote terminal) buffer is occupied based on the first statistical datum.

Some embodiments may determine or evaluate the status of the remote device (e.g. whether the remote device is congested, the reason for the congestion, how congested the remote device is, the capacity of the remote device buffer, etc.) by examining the transmission situation of packets. Certainly, the capacity of the receiving terminal buffer can be determined to be insufficient through FIG. 2(c) or FIG. 2(d), so that it may be unnecessary to perform both determinations simultaneously. In another embodiment, when the transmission situation of packets does not present the distributions of FIGS. 2(a) and 2(b) (the retry is affected by the receiving terminal itself), excluding the possibility that the receiving terminal malfunctions (the receiving terminal still can receive data packets), the disclosed methods can determine that the capacity of the receiving terminal buffer is insufficient, especially under the current transmission rate.

Certainly, the distribution of the quantity of data packets resulting from the insufficiency of the capacity of the receiving terminal buffer may vary with the extent of insufficiency of the capacity of the receiving terminal buffer. And the receiving situations are not limited to the variations illustrated above. The methods and devices in one embodiment determines the status of the remote device by analyzing the transmission situation of packets, thereby appropriately controlling the status of the transmitting, remote, or both devices to obtain a better transmission quality.

If other different statuses of the remote device (e.g. the capacity of buffer and different setting of parameters) are to be determined, the packet transmission can be adjusted. For example, additional statistical features from relevant experiments or other results can be obtained and further considered. In this way, when statistical features conforming to the relevant experiments are found during the operating process, other different statuses of the remote device can be determined.

The transmitting terminal can be an access point. The transmitting terminal performs message communication with the receiving terminal via a communication protocol. In the environment of WLAN, the transmitting terminal and the receiving terminal perform message communication via a communication protocol of the wireless network standard of IEEE 802.11.

Through the above-mentioned communication method, when the receiving terminal buffer is found to be fully occupied (the capacity thereof is insufficient) to cause congestion (the receiving terminal cannot receive normally for the moment), the processor 203 does not need to reduce the transmission rate; instead, the processor 203 may increase the time interval between packets (e.g. controlling the period and quantity of retry of data packets). This enables the receiving terminal buffer to release more storage space during the time interval, and the transmission rate does not need to be reduced. Such adjusting mechanism is applicable to both the independent network and the central-control network.

Figure 3:
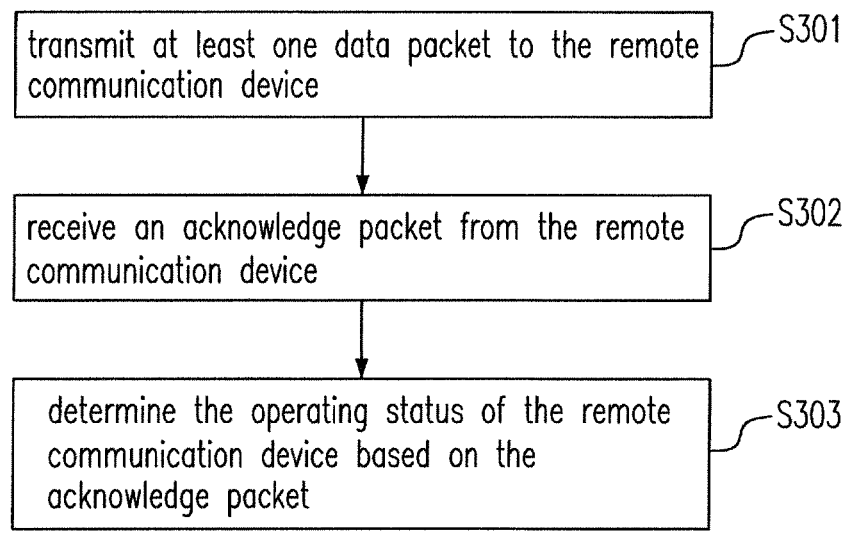
FIG. 3 shows an exemplary flowchart relating to a communication method consistent with the disclosed embodiments.

FIG. 3 shows an exemplary flowchart relating to a communication method consistent with the disclosed embodiments. The communication method may include the following steps:

S301: transmitting at least one data packet to the remote communication device;

S302: receiving an acknowledgement packet from the remote communication device; and S303: determining the operating status of the remote communication device based on the acknowledgement packet.

Several further preferred embodiments are described as follows.

Figure 4A:
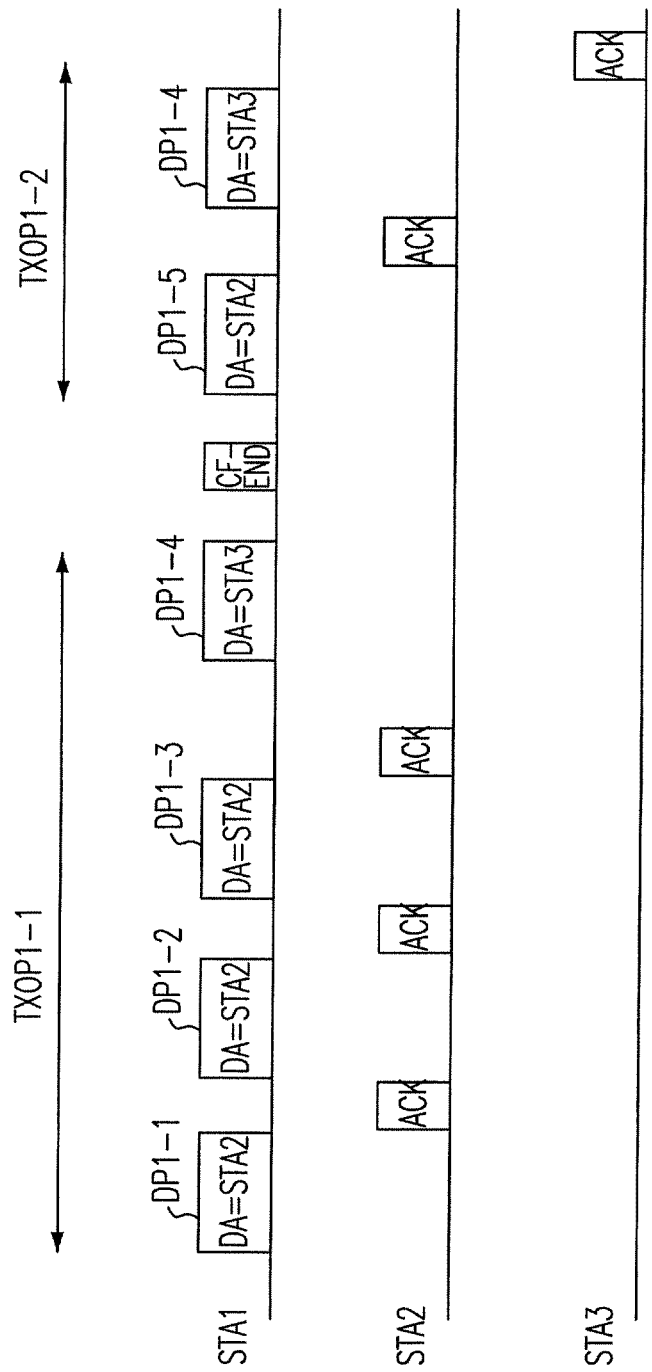
FIG. 4(a) illustrates an example in controlling the transmission period of data packets consistent with the disclosed embodiments.

FIG. 4(a) illustrates an example in controlling the transmission period of data packets consistent with the disclosed embodiments. FIG. 4(a) is exemplified by a central-control network. There are three terminals STA1, STA2 and STA3 in FIG. 4(a), wherein the terminal STA2 includes a first buffer and the terminal STA3 includes a second buffer. DA (Destination Address) is the address of the receiving terminal that receives the transmitted data packet. In this embodiment, the terminal STA2 possesses high-speed transmission efficiency and the terminal STA3 possesses low-speed transmission efficiency. The terminal STA1 transmits a data packet DP1-1 to the terminal STA2. After this transmission, if the terminal STA1 detects that the first buffer of the terminal STA2 is not fully occupied by using any of the above-mentioned detecting methods, it sequentially transmits the data packets DP1-2 and DP1-3 to the terminal STA2 within a first transmission period TXOP1-1. The terminal STA2 responds with an ACK packet to notify the terminal STA1 that the data packet has been received.

The terminal STA1 transmits the data packet DP1-4 to the terminal STA3 within the first transmission period TXOP1-1. After this transmission, if the terminal STA1 detects that the second buffer of the terminal STA3 has been fully occupied by using any of the above-mentioned detecting methods, which causes the terminal STA3 to be congested leading to failure in transmitting the data packet DP1-4, it uses a CF-End packet to end the first transmission period TXOP1-1 (i.e., the terminal STA1 does not retry the data packet DP1-4 but performs data transmission with the terminal STA2). The terminal STA1 does not retry the data packet DP1-4 within the first transmission period TXOP1-1, but performs data transmission with the terminal STA2 to enhance the transmission efficiency therebetween.

Subsequently, the terminal STA1 transmits the data packet DP1-5 to the terminal STA2 within a second transmission period TXOP1-2, and then retries the data packet DP1-4 to the terminal STA3. Another method of retrying the data packet DP1-4 is not to retry the data packet DP1-4 within the first transmission period TXOP1-1 and the second transmission period TXOP1-2. In another embodiment, data packets are transmitted by using the quality of service (QOS) within the first transmission period TXOP1-1 and the second transmission period TXOP1-2. Therefore, after the terminal STA1 transmits the data packet DP1-1, the next data packet DP1-2 can be transmitted without contending with other transmitting terminals, thereby enhancing the transmission efficiency of data packets.

Figure 4B:
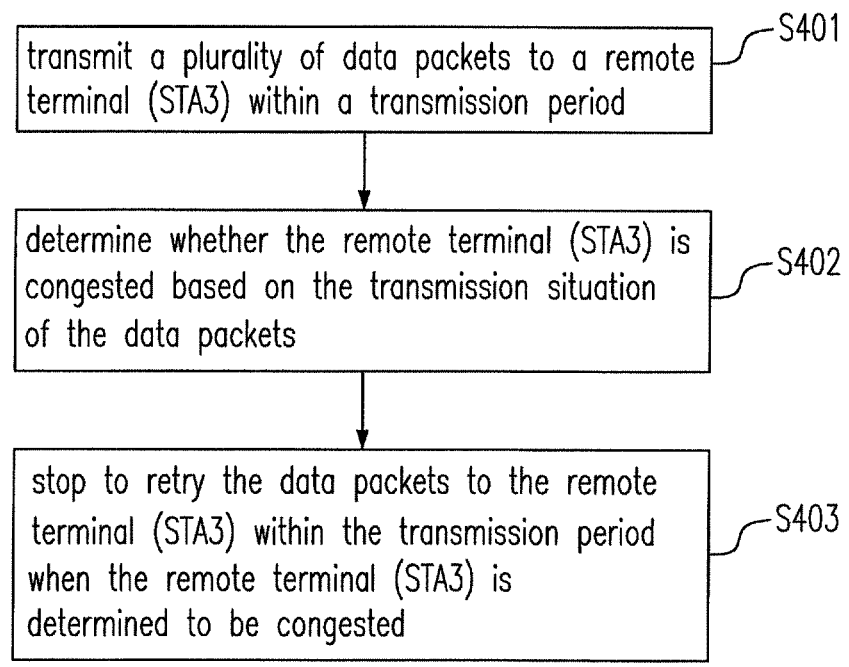
FIG. 4(b) shows an exemplary flowchart relating to a communication method consistent with the disclosed embodiments.

FIG. 4(b) shows an exemplary flowchart relating to a communication method consistent with the disclosed embodiments. The method of adjusting the period of retry for transmitting data packets from the terminal STA1 to the terminal STA3 may include:

S401: transmitting a plurality of data packets to a remote terminal (STA3) within a transmission period;

S402: determining whether the remote terminal (STA3) is congested based on the transmission situation of the data packets; and S403: stopping to retry the data packets to the remote terminal (STA3) within the transmission period when the remote terminal (STA3) is determined to be congested.

Figure 5A:
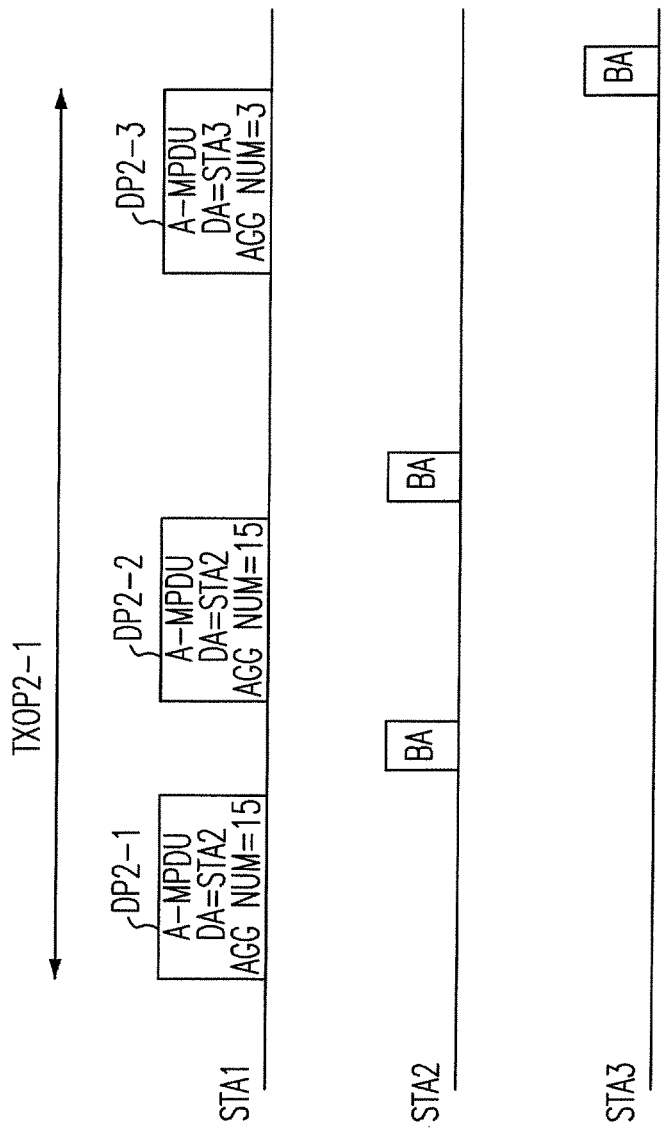
FIG. 5(a) illustrates an example in controlling the quantity of data packets transmitted, consistent with the disclosed embodiments.

FIG. 5(a) illustrates an example in controlling the quantity of data packets transmitted, consistent with the disclosed embodiments. There are three terminals STA1, STA2 and STA3 in FIG. 5(a), wherein the terminal STA2 includes a first buffer and the terminal STA3 includes a second buffer. A-MPDU (MAC Protocol Data Unit Aggregation) represents aggregation data packets. In this embodiment, the terminal STA2 possesses high-speed transmission efficiency and the terminal STA3 possesses low-speed transmission efficiency.

The terminal STA1 transmits a data packet DP2-1 to the terminal STA2. After this transmission, if the terminal STA1 detects that the first buffer of the terminal STA2 is not fully occupied (in another word, the first buffer of the terminal STA2 has enough capacity to receive a next data packet), it transmits the data packet DP2-2 to the terminal STA2 within a first transmission period TXOP2-1. The terminal STA2 responds with a BA packet (Block acknowledgement packet) to notify the terminal STA1 that the data packet has been received. The data packets DP2-1, DP2-2 and DP2-3 have information about the aggregation number (AGG NUM) respectively. The AGG NUM in the data packet DP2-3 is 3, and that in other data packets is 15.

Subsequently, the terminal STA1 transmits the data packet DP2-3 to the terminal STA3 within the first transmission period TXOP2-1. After this transmission, if the terminal STA1 detects that the capacity of the second buffer of the terminal STA3 is insufficient (a part of the second buffer of the terminal STA3 is occupied, i.e., not released) by using any of the above-mentioned detecting methods, it reduces the aggregation number in the data packet DP2-3 from 15 to 3 (i.e., reducing the data quantity of the packet to overcome the issue of the insufficiency of capacity of the second buffer). Since the retry of data packets from the terminal STA1 to the terminal STA2 is avoided and the terminal STA3 still can receive the data of 3 packets, the transmission efficiency between the terminals STA1 and STA2 as well as that between the terminals STA1 and STA3 can be enhanced simultaneously. In this embodiment, the effect of aggregation is fully utilized when the transmission to the high-speed interface device is smooth, and the effect of aggregation is reduced when the transmission to the low-speed interface device is unsmooth.

Figure 5B:
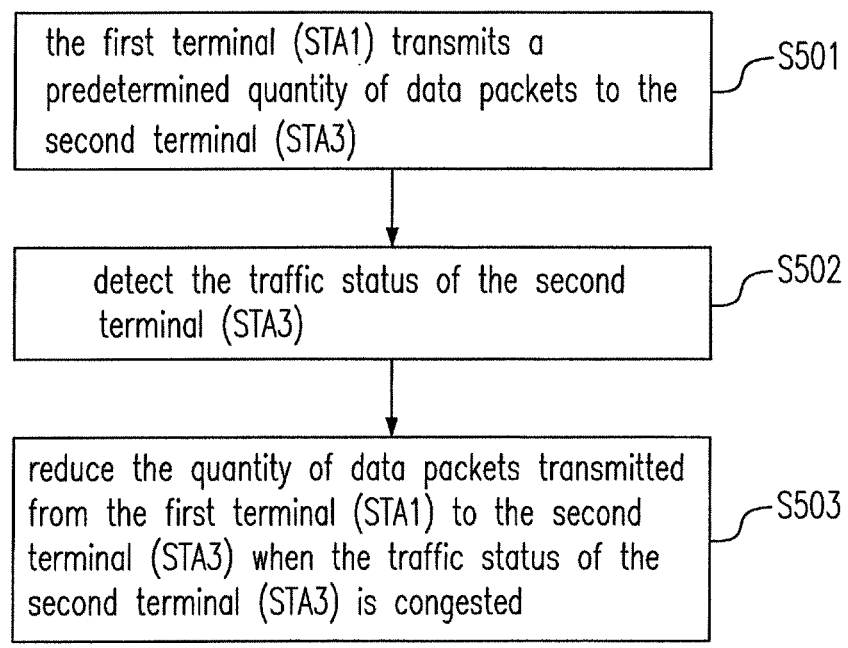
FIG. 5(b) shows an exemplary flowchart relating to a communication method consistent with the disclosed embodiments.

FIG. 5(b) shows an exemplary flowchart relating to a communication method consistent with the disclosed embodiments. The method of adjusting the quantity of data packets at the retry of data packets from the terminal STA1 to the terminal STA3 may include:

S501: the first terminal (STA1) transmitting a predetermined quantity of data packets to the second terminal (STA3);

S502: detecting the traffic status of the second terminal (STA3); and

S503: reducing the quantity of data packets transmitted from the first terminal (STA1) to the second terminal (STA3) when the traffic status of the second terminal (STA3) is congested.

Figure 6A:
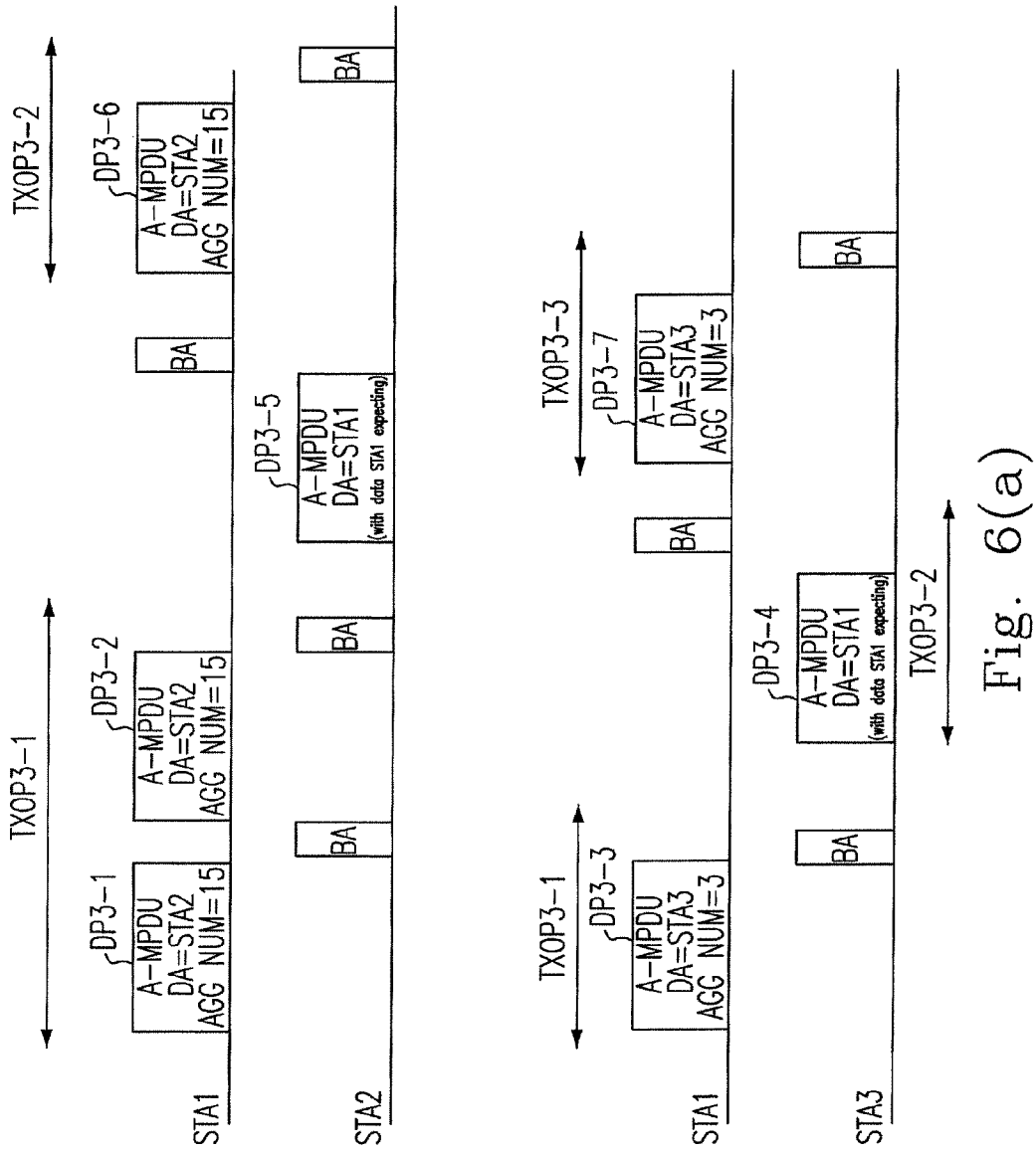
FIG. 6(a) illustrates an example in controlling the transmission of data packets consistent with the disclosed embodiments.

In another embodiment, the operating mode can be set so that the transmitting terminal can keep on performing transmission only after receiving a specific data packet transmitted actively by the receiving terminal. If the first terminal does not receive the specific datum, it will transmit data to other devices. FIG. 6(a) illustrates an example in controlling the transmission of data packets consistent with the disclosed embodiments. In FIG. 6(a), there are three terminals STA1, STA2 and STA3, wherein the terminal STA2 includes a first buffer and the terminal STA3 includes a second buffer. In FIG. 6(a), the terminal STA1 can keep on performing transmission only after receiving a specific datum transmitted actively by the terminal STA2. The terminal STA2 responds with a BA packet after receiving data packets. Subsequently, the terminal STA2 transmits the specific data packet to the terminal STA1 actively, and the terminal STA1 responds with a BA packet after receiving the specific data packet. The specific data packet has TCP (Transport Control Protocol) acknowledgement information, which can notify the transmitting terminal (i.e. the terminal STA1) of the quantity of data packets that can be received by the terminal STA2 at present. Accordingly, the terminal STA1 can adjust the quantity of data packets transmitted to the terminal STA2 dynamically based on the TCP acknowledgement information. The specific data packet can include the information about the first buffer or the information about time.

The above-mentioned method can be achieved by the first communication device 20. The processor 203 conjectures the transmission rate of a network. The media access controller 201 (corresponding to the transmitting/receiving terminal) receives an arrangement datum. The processor 203 compares the transmission rate of the network with the arrangement datum to analyze the traffic status of the network.

Through the above-mentioned mechanism, after the terminal STA1 receives the specific data packets having the TCP acknowledgement information from the terminals STA2 and STA3, terminal STA1 can know the respective quantities of data packets that can be received by the terminals STA2 and STA3. Accordingly, the terminal STA1 can adjust the respective quantities of data packets transmitted to the terminals STA2 and STA3 dynamically based on the TCP acknowledgement information.

Figure 6B:
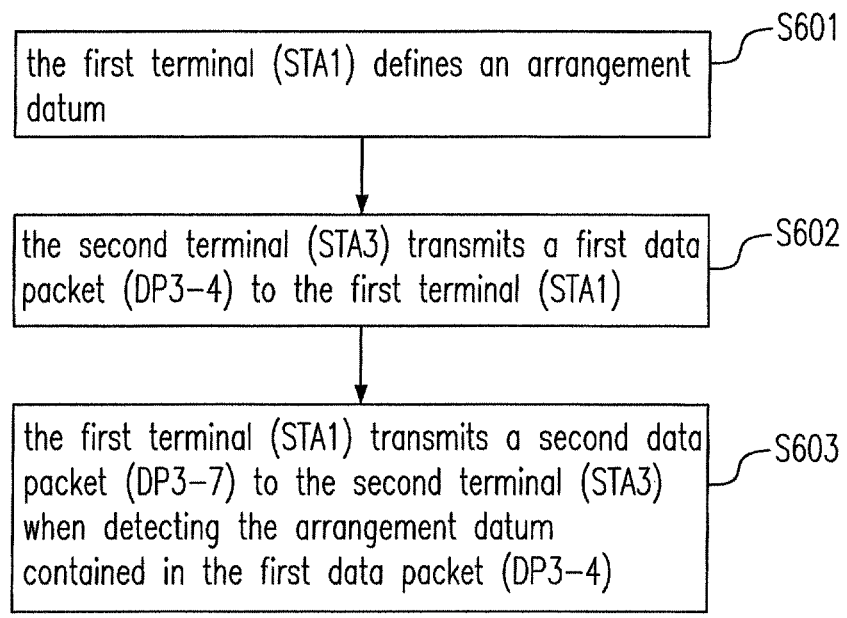
FIG. 6(b) shows an exemplary flowchart relating to a communication method consistent with the disclosed embodiments.

FIG. 6(b) shows an exemplary flowchart relating to a communication method consistent with the disclosed embodiments. The method of controlling the transmission of data packets from the terminal STA1 to the terminal STA3 may include:

S601: the first terminal (STA1) defining an arrangement datum;

S602: the second terminal (STA3) transmitting a first data packet (DP3-4) to the first terminal (STA1); and S603: the first terminal (STA1) transmitting a second data packet (DP3-7) to the second terminal (STA3) when detecting the arrangement datum contained in the first data packet (DP3-4).

Consistent with the disclosed embodiments, communication methods may include: transmitting data packets from a first communication device to a second communication device; and examining packet receipt status information from the second communication device. The packet receipt status information may include or indicate packet receipt status of the data packets by the second communication device. The method may further include evaluating the packet receipt status information at the first communication device to identify a packet receipt characteristic associated with the second communication device; and controlling data packet transmission from the first communication device to the second communication device based on the packet receipt characteristic associated with the second communication device.

In some embodiments, the first communication device is a central communication device, and the second communication device is a remote communication device coupled with the second communication device via at least one wireless communication channel. In some examples, the first communication device is coupled with multiple second communication devices having different packet receipt rates, packet handling capabilities, or packet receipt buffering characteristics. The examination of the packet receipt status information may include examining information representing that the first communication device receives no packet-receipt acknowledgement from the second communication device for at least one of the data packets. The evaluation of the packet receipt status information at the first communication device may include examining or observing at least one of a retry histogram, a multiple peak distribution, a peak distribution, a heavily-tailed distribution, and an abnormal block acknowledgement, consistent with what is described above.

In some embodiments, when the packet receipt status information suggests a substantial exponential decay over time in a number of the packets received, it is possible that the packet receipt characteristic is not dependent on a utilization rate of a buffer of the second communication device. In some embodiments, transmitting the data packets to the second communication device may include: dividing the data packets into groups at the first communication device; sequentially transmitting the groups of the data packets from the first communication device to the second communication device; and when the transmission status information indicates a packet of a group is not received by the second communication device, transmitting remaining groups of data packets at a next transmission attempt to the second remote device.

In some embodiments, controlling the data packet transmission may include adjusting the time between transmitting the data packets or data packet groups from the first communication device to the second communication device.

Various communication methods can be implemented. In some examples, a method may include transmitting data packets from a first communication device to a plurality of second communication devices; and examining packet receipt status information from each of at least some of the plurality of the second communication devices. The packet receipt status information of each corresponding second communication device may include status indication of the data packets received by the corresponding second communication device. The method may further include evaluating the packet receipt status information of the corresponding second communication devices at the first communication device to identify packet receipt characteristics associated with the corresponding second communication devices; and controlling data packet transmission from the first communication device to the at least some of the plurality of the second communication devices based on the packet receipt characteristics. Other options or variations as illustrated above can also be further implemented with the method.

Various communication devices can also be implemented. For example, a communication device may include a transmitting circuit for transmitting packets from a first communication device to a second communication device and a processor in the first communication device and coupled with the transmitting circuit. The processor may evaluate the packet receipt status information to identify a packet receipt characteristic associated with the second communication device and control data packet transmission from the first communication device to the second communication device based on the packet receipt characteristic associated with the second communication device. Other options or variations as illustrated above, such as different devices, different network configurations, different examination, evaluation, or control mechanisms or techniques, can also be further implemented with the device.

It will be apparent to those skilled in the art that various modifications and variations can be made to the disclosed embodiments. The specification and embodiments are merely exemplary, with a true scope of the disclosure being indicated by the following claims and their equivalents.

We claim:

1. A communication method comprising:
   transmitting data packets from a first communication device to a second communication device;
   examining packet receipt status information from the second communication device, the packet receipt status information comprising packet receipt status of the data packets received by the second communication device;
   evaluating the packet receipt status information at the first communication device to identify a packet receipt characteristic associated with the second communication device, wherein evaluating the packet receipt status information includes recording a history of success and failure of retry transmissions by the first communication device to the second communication device, generating a retry histogram based on the history, the retry histogram providing a distribution pattern of the retry transmissions over time that uniquely indicates one of a plurality of possible conditions, of one or a combination of a channel over which the data packets are transmitted and of the second communication device, that cause the retry transmissions, and examining the retry histogram to identify the packet receipt characteristic, the packet receipt characteristic comprising the one of the plurality of possible conditions; and
   controlling data packet transmission from the first communication device to the second communication device based on the packet receipt characteristic associated with the second communication device.

2. The method as claimed in claim 1, wherein the first communication device is a central communication device, and the second communication device is a remote communication device coupled with the first communication device via at least one wireless communication channel.

3. The method as claimed in claim 1, wherein the first communication device is coupled with a plurality of second communication devices having different packet receipt rates, packet handling capabilities, or packet receipt buffering characteristics, the plurality of second communication devices including the second communication device.

4. The method as claimed in claim 1, wherein examining the packet receipt status information comprises examining information representing that the first communication device receives no packet-receipt acknowledgement from the second communication device for at least one of the data packets.

5. The method as claimed in claim 1, wherein when the packet receipt status information suggests a substantial exponential decay over time in a number of the packets received, the packet receipt characteristic is not dependent on a utilization rate of a buffer of the second communication device.

6. The method as claimed in claim 1, wherein transmitting the data packets to the second communication device comprises:
   dividing the data packets into groups at the first communication device;
   sequentially transmitting the groups of the data packets from the first communication device to the second communication device; and
   when the packet receipt status information indicates one data packet of one of the groups of the data packets is not received by the second communication device, transmitting remaining ones of the groups of the data packets at a next transmission attempt to the second communication device.

7. The method as claimed in claim 1, wherein controlling the data packet transmission comprises adjusting a time between transmitting the data packets or data packet groups from the first communication device to the second communication device.

8. The method as claimed in claim 1, wherein the packet receipt characteristic reveals, upon the evaluation, that the one of the plurality of conditions comprises a communications channel problem between the first and second communication devices or a buffer capacity problem at the second communication device.

9. A communication method comprising:
transmitting data packets from a first communication device to a plurality of second communication devices;
examining packet receipt status information from each of at least some of the plurality of the second communication devices, the packet receipt status information of each of the at least some of the plurality of the second communication devices comprising status indication of the data packets received by each of the at least some of the plurality of the second communication devices;
evaluating the packet receipt status information of each of the at least some of the plurality of the second communication devices at the first communication device to identify packet receipt characteristics associated with each of the at least some of the plurality of the second communication devices, wherein evaluating the packet receipt status information includes recording a history of success and failure of retry transmissions by the first communication device to the at least some of the plurality of the second communication devices, generating a retry histogram based on the history, the retry histogram providing a distribution pattern of the retry transmissions over time that uniquely indicates one of a plurality of possible conditions, of one or a combination of a channel over which the data packets are transmitted and of the second communication device, that cause the retry transmissions, and examining the retry histogram to identify the packet receipt characteristics, the packet receipt characteristic comprising the one of the plurality of possible conditions; controlling data packet transmission from the first communication device to the at least some of the plurality of the second communication devices based on the packet receipt characteristics.

10. The method as claimed in claim 9, wherein the first communication device is a central communication device, and at least one of the plurality of second communication devices is a remote communication device coupled with the first communication device via at least one wireless communication channel.

11. The method as claimed in claim 9, wherein the first communication device is coupled with the plurality of second communication devices having different packet receipt rates, packet handling capabilities, or packet receipt buffering characteristics.

12. The method as claimed in claim 9, wherein examining the packet receipt status information comprises examining information representing that the first communication device receives no packet-receipt acknowledgement from at least one of the plurality of the second communication devices for at least one of the data packets.

13. The method as claimed in claim 9, wherein controlling the data packet transmission comprises adjusting a time between transmitting the data packets or data packet groups from the first communication device to the second communication device.

14. The method as claimed in claim 9, wherein the packet receipt characteristics reveal, upon the evaluation, that the one of the plurality of conditions comprises a communications channel problem between the first and the at least some of the plurality of the second communication devices, or a buffer capacity problem at the at least some of the plurality of the second communication devices.

15. A communication device comprising:
a transmitting circuit for transmitting packets from a first communication device to a second communication device; and
a processor in the first communication device and coupled with the transmitting circuit, the processor evaluating packet receipt status information to identify a packet receipt characteristic associated with the second communication device,
wherein the processor evaluates the packet receipt status information based on recording a history of success and failure of retry transmissions by the first communication device to the second communication device, generating a retry histogram based on the history, the retry histogram providing a distribution pattern of the retry transmissions over time that uniquely indicates one of a plurality of possible conditions, of one or a combination of a channel over which the data packets are transmitted and of the second communication device, that cause the retry transmissions, and examining the retry histogram to identify the packet receipt characteristic, the packet receipt characteristic comprising the one of the plurality of possible conditions, and wherein the processor controls data packet transmission from the first communication device to the second communication device based on the packet receipt characteristic associated with the second communication device.

16. The device as claimed in claim 15, wherein the first communication device is a central communication device, and the second communication device is a remote communication device coupled with the first communication device via at least one wireless communication channel.

17. The device as claimed in claim 15, wherein the first communication device is coupled with a plurality of second communication devices having different packet receipt rates, packet handling capabilities, or packet receipt buffering characteristics, the plurality of second communication devices including the second communication device.

18. The device as claimed in claim 15, wherein the packet receipt status information comprises having no packet-receipt acknowledgement from the second communication device for at least one of the data packets.

19. The device as claimed in claim 15, wherein the processor controls the data packet transmission by at least adjusting a time between transmitting the data packets or data packet groups from the first communication device to the second communication device.

20. The device as claimed in claim 15, wherein the packet receipt characteristic reveals, upon the evaluation, that the one of the plurality of conditions comprises a communications channel problem between the first and second communication devices or a buffer capacity problem at the second communication device.

* * * * *